US011245776B2

(12) United States Patent
Sherwani et al.

(10) Patent No.: US 11,245,776 B2
(45) Date of Patent: Feb. 8, 2022

(54) DATA MODEL FOR UNIFORM DATA PLATFORM

(71) Applicant: Sony Interactive Entertainment LLC, San Mateo, CA (US)

(72) Inventors: Adil Sherwani, Oakland, CA (US); Steven Patrick Trombetta, San Francisco, CA (US); Warren Benedetto, Foothill Ranch, CA (US); Landon Noss, Faguna Niguel, CA (US); Oleksii Kyrych, Foster City, CA (US); Nitin Mohan, San Francisco, CA (US); Hugh Alexander Dinsdale Spencer, Solihull (GB); Paul Edridge, Hove (GB); Pritpal Singh Panesar, London (GB); Benedikt Neuenfeldt, Tokyo (JP); Yohei Nishikawa, Tokyo (JP); Nobukazu Koyama, Tokyo (JP)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/653,619

(22) Filed: Oct. 15, 2019

(65) Prior Publication Data

US 2020/0128100 A1   Apr. 23, 2020

Related U.S. Application Data

(60) Provisional application No. 62/748,902, filed on Oct. 22, 2018.

(51) Int. Cl.
*H04L 29/08* (2006.01)
*A63F 13/77* (2014.01)

(52) U.S. Cl.
CPC .............. *H04L 67/32* (2013.01); *A63F 13/77* (2014.09); *H04L 67/12* (2013.01); *H04L 67/306* (2013.01)

(58) Field of Classification Search
CPC ....... H04L 67/32; H04L 67/12; H04L 67/306; A63F 13/77
(Continued)

(56) References Cited

U.S. PATENT DOCUMENTS 9,449,526 B1    9/2016 Tseng et al.
10,142,204 B2 * 11/2018 Nickolov ............ H04L 43/0817
(Continued)

FOREIGN PATENT DOCUMENTS

CN     113260428 A     8/2021
CN     113260434 A     8/2021
(Continued)

OTHER PUBLICATIONS

"International Search Report" and "Written Opinion of the International Searching Authority," Patent Cooperation Treaty Application No. PCT/US2019/056892, dated Jan. 10, 2020, 8 pages.
(Continued)

*Primary Examiner* — Tauqir Hussain
(74) *Attorney, Agent, or Firm* — Carr & Ferrell LLP (57) ABSTRACT

Computer implemented methods and systems for providing a uniform data platform for at least one application of a plurality of applications are disclosed. Exemplary methods include receiving application data from at least one of a device and a server, a device executing a portion of an application of a plurality of applications, storing the application data in a data platform, the data model including at least one metadata and at least one event, the one metadata corresponding to at least one object indicated in the data model, and the one event corresponding to a trigger condition associated with the one metadata entry, wherein values of the one metadata and one event are associated with a user profile and accessing via a plurality of remote networked services, the application data stored in the data platform, the
(Continued)

plurality of remote network services accessing the application data using the data model.

19 Claims, 5 Drawing Sheets

(58) Field of Classification Search
USPC .......................................................... 709/223
See application file for complete search history.

(56) References Cited

U.S. PATENT DOCUMENTS

| | | |
|---|---|---|
| 2003/0009549 A1 | 1/2003 | Maehiro |
| 2003/0047874 A1* | 3/2003 | Leen ................... G07F 17/3244 273/292 |
| 2004/0093515 A1 | 5/2004 | Reeves, Jr. |
| 2006/0121991 A1 | 6/2006 | Borinik et al. |
| 2008/0268947 A1* | 10/2008 | Fyock ................... A63F 13/352 463/29 |
| 2009/0264202 A1* | 10/2009 | Chen ....................... A63F 13/79 463/42 |
| 2010/0119215 A1 | 5/2010 | Chien et al. |
| 2011/0281648 A1 | 11/2011 | Weising |
| 2012/0072941 A1 | 3/2012 | Thornberry et al. |
| 2012/0081306 A1 | 4/2012 | Sirpal et al. |
| 2013/0045803 A1 | 2/2013 | Kang et al. |
| 2013/0227086 A1 | 8/2013 | Stout |
| 2013/0325954 A1 | 12/2013 | Cupala et al. |
| 2014/0101244 A1 | 4/2014 | Klein et al. |
| 2014/0181197 A1 | 6/2014 | Baggott |
| 2014/0214980 A1 | 7/2014 | Jung |
| 2014/0278686 A1* | 9/2014 | Mullings ............ G06Q 10/1097 705/7.21 |
| 2014/0297260 A1 | 10/2014 | Allen |
| 2014/0297798 A1 | 10/2014 | Bakalash et al. |
| 2014/0349749 A1 | 11/2014 | Nogami et al. |
| 2015/0005065 A1 | 1/2015 | Mizuki et al. |
| 2015/0007014 A1 | 1/2015 | Allen |
| 2016/0149956 A1 | 5/2016 | Birnbaum et al. |
| 2016/0191999 A1 | 6/2016 | Friedrich |
| 2017/0136367 A1* | 5/2017 | Watari .................... A63F 13/63 |
| 2017/0259177 A1* | 9/2017 | Aghdaie ................. A63F 13/35 |
| 2017/0333789 A1 | 11/2017 | Shepard et al. |
| 2018/0152758 A1 | 5/2018 | Miller |
| 2018/0152759 A1 | 5/2018 | Miller |
| 2018/0373689 A1 | 12/2018 | Haynes et al. |
| 2019/0253757 A1 | 8/2019 | Leister |
| 2019/0291010 A1 | 9/2019 | Benedetto et al. |
| 2020/0122041 A1 | 4/2020 | Sherwani et al. |
| 2020/0129863 A1 | 4/2020 | Sherwani et al. |

FOREIGN PATENT DOCUMENTS

| | | |
|---|---|---|
| WO | WO2017121768 A1 | 7/2017 |
| WO | WO2020086337 A1 | 4/2020 |
| WO | WO2020086393 A1 | 4/2020 |
| WO | WO2020086666 A1 | 4/2020 |

OTHER PUBLICATIONS

"International Search Report" and "Written Opinion of the International Searching Authority," Patent Cooperation Treaty Application No. PCT/US2019/057570, dated Jan. 14, 2020, 11 pages.

"International Search Report" and "Written Opinion of the International Searching Authority," Patent Cooperation Treaty Application No. PCT/US2019/056338, dated Jan. 14, 2020, 9 pages.

* cited by examiner

DATA MODEL FOR UNIFORM DATA PLATFORM

CROSS REFERENCE TO RELATED APPLICATIONS

This application claims the benefit of U.S. Provisional Application No. 62/748,902, filed on Oct. 22, 2018.

FIELD

The present technology relates generally to remote networked game services, and more particularly to systems and methods for providing a data model for a uniform data platform.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Video games are getting more complex, while the time allotted to play them is more limited than ever. Players want to stay engaged and immersed in the video games that they play, from start to finish. However, these players often have questions about the game that they are playing, and to get answers to these questions, they have to leave the game and engage with third party sites. This is because in-game states and video game activities are not aggregated and analyzed across video games and video game players. It would be a colossal amount of work for a game developer to implement all the features necessary to provide the player help with the game and to reduce player frustration within the context of a single game. Therefore, a data model and developer-friendly API is needed to support multiple players and gaming environments across a uniform data platform.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a computer-implemented system for providing data model for a uniform data platform is provided. The system can include at least one device configured to execute at least one application of a plurality of applications, the application having an application data structure and a uniform data platform executed on one or more servers, the uniform data platform having a data model that is uniform across the plurality of application data structures. The data model can include at least one metadata corresponding to at least one object indicated in the data model, and the data model can also include at least one event corresponding to a trigger condition associated with at least one metadata entry, wherein values of the at least one metadata and the at least one event are associated with a user profile, wherein the uniform data platform is configured to receive application data from the at least one device and to store the application data within the data model. The system can also include a plurality of remote networked services configured to access the application data from the uniform data platform using the data model.

The at least one object indicated in the data model can include an activity, an action, an outcome, a location, a character attribute, and a progression. The application data can be organized according to a logical data structure common to the plurality of applications. An application developer can develop the at least one application of a plurality of applications according to the logical data structure. The application data can include game data. The plurality of applications can include a plurality of games running on a plurality of user devices. The logical structure can include a state, location data, character stats, and at least one choice. The state can be unlockable, unavailable, in progress, and completed and provide an indication of a progression or an activity of a player. The uniform data platform, the at least one application of a plurality of applications, the server, and the device can be connected via the plurality of the network services.

According to another example embodiment of the disclosure, a computer-implemented method for providing a data model for a uniform data platform is provided. The method can include receiving application data from at least one of a device and a server, the device executing at least a portion of an application of a plurality of applications, the application having an application data structure; and storing the application data in a data platform, the data platform having a data model uniform across the plurality of application data structures. The data model can include at least one metadata and at least one event, the at least one metadata corresponding to at least one object indicated in the data model, and the at least one event corresponding to a trigger condition associated with at least one metadata entry. The values of the at least one metadata and at least one event can be associated with a user profile. The method can also include accessing, via a plurality of remote networked services, the application data stored in the data platform. The plurality of remote network services can access the application data using the data model.

The at least one object indicated in the data model can include an activity, an action, an outcome, a location, a character attribute, and a progression. The application data can be organized according to a logical data structure common to the plurality of applications. An application developer can develop the at least one application of a plurality of applications according to the logical data structure. The application data can include game data. The plurality of applications can include a plurality of games running on a plurality of user devices. The logical structure can include a state, location data, character stats, and at least one choice. The state can be unlockable, unavailable, in progress, and completed, and the state can further provide an indication of a progression or an activity of a player. The uniform data platform, the at least one application of a plurality of applications, the server, and the device can be connected via the plurality of the network services.

According to another example embodiment of the present disclosure, the steps of the method for providing a data model for a uniform data platform is stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In one example embodiment, a data model disclosed herein describes the logical structure of a uniform data system to which a game developer may be required to conform, in order for the platform to understand the data and to allow players to re-engage in gameplay-related features and services on the platform. This approach can enable the uniform data platform to realize features requiring game data without requiring games to be patched separately to support each feature.

The data model described herein provides a logical structure for the uniform data platform that can be applied to a wide range of gameplay-related features and services on the platform. The data model can obtain data from games and ensure that the game state is understood across the uniform data platform while the game is being played. This provides a logical structure on top of the game structure (e.g., events). The data model can allow the assignment of meaning to the events (e.g., as quests, activities, progression, actions, and enemies) within the proper context. Such a set of game data can be a unifying factor across multiple games and players.

Figure 1:
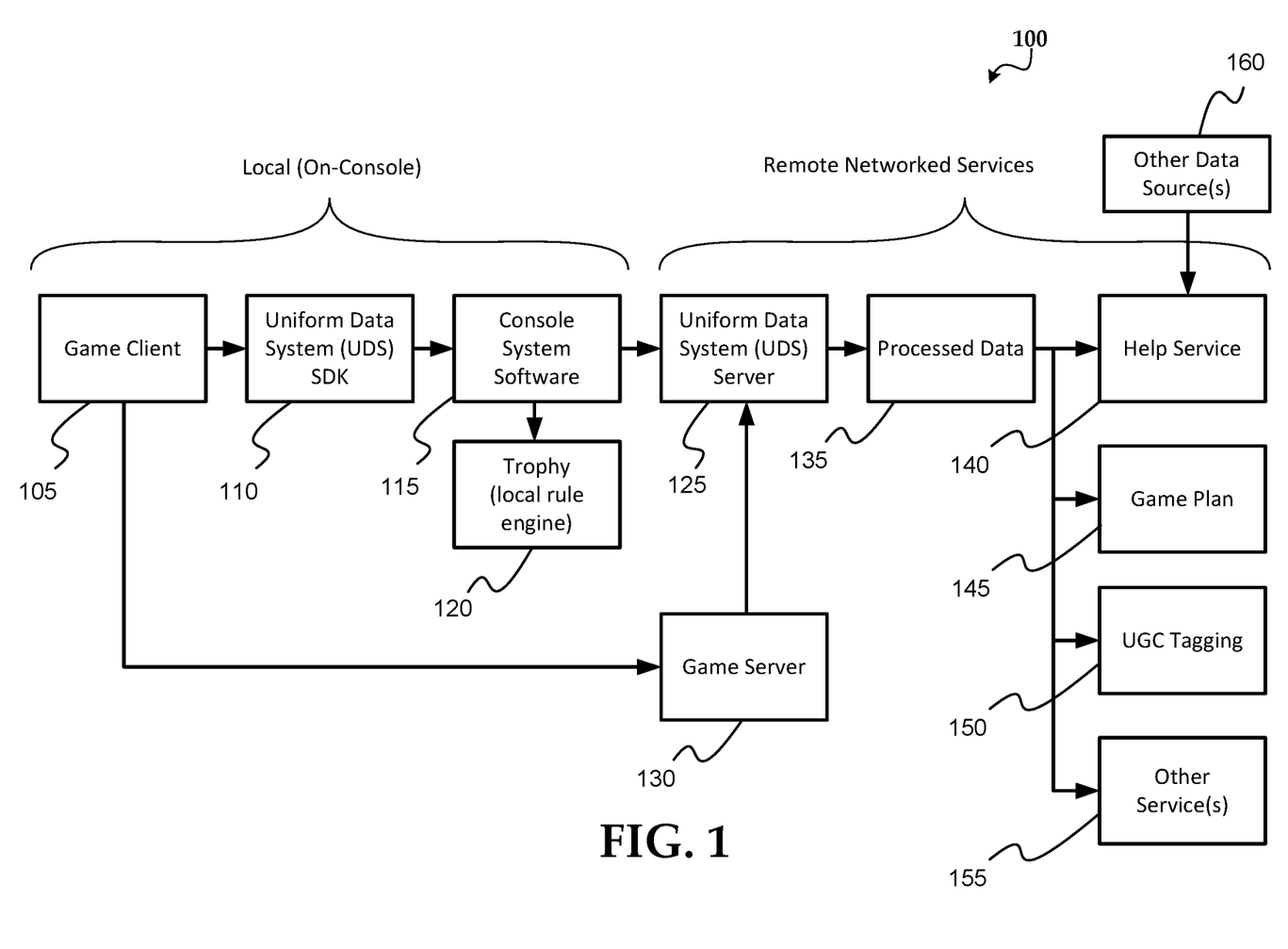
FIG. 1 shows an exemplary system architecture for providing users with contextual information regarding available game activities, according to one example embodiment.

FIG. 1 is an exemplary system architecture 100 for providing users with contextual information regarding available game activities, according to one example embodiment. In some embodiments, the exemplary system architecture 100 includes a game client 105, a uniform data system (UDS) software development kit (SDK) 110, console system software 115, a local rule engine 120, a UDS server 125, a game server 130, processed data 135, and one or more other remote networked services, including a help service 140, game plan 145, user generated content (UGC) tagging 150, and other service(s) 155. The help service 140 may also receive information from other data source(s) 160.

The game client 105 and game server 130 provide contextual information regarding at least one application of a plurality of applications to a uniform data system (UDS) server 125 via a UDS data model describing the logical structure of UDS data used by the UDS SDK 110. The UDS data model enables the platform to realize remote networked services, such as the help service 140, game plan 145, UGC tagging 150, and other service(s) 155 that require game data, without requiring each game to be patched separately to support each service. The UDS data model assigns contextual information to each portion of information in a unified way across games. The contextual information from the game client 105 and UDS SDK 110 is provided to the UDS server 125 via the console system software 115. It is to be understood that the game client 105, UDS SDK 110, console system software 115, and local rule engine 120 may run on a computer or other suitable hardware for executing a plurality of applications.

The UDS server 125 receives and stores contextual information from the game client 105 and game server 130 from at least one application of a plurality of applications. To be sure, the UDS server 125 may receive contextual information from a plurality of game clients and game servers for multiple users. The information may be uniformly processed 135 and then received by the plurality of remote networked services 140, 145, 150, and 155.

Figure 2:
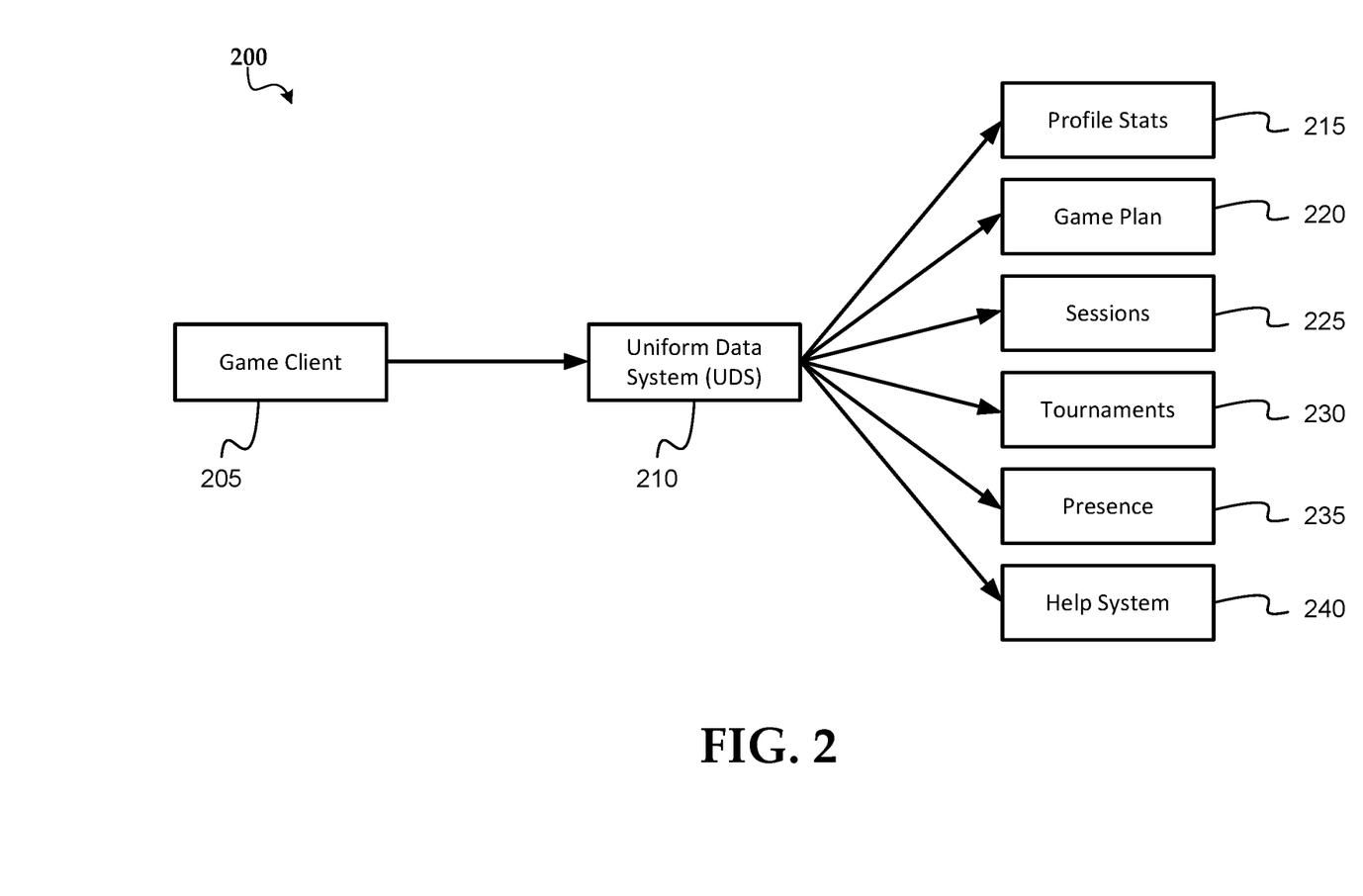
FIG. 2 illustrates another exemplary system architecture, according to one example embodiment.

FIG. 2 shows another exemplary embodiment of a system architecture according to the present disclosure. A game client 205 sends contextual information to a UDS server 210, which provides the contextual information in a unified data model to a plurality of remote networked services, including profile stats 215, game plan 220, sessions 225, tournaments 230, presence 235, and help system 240.

Figure 3:
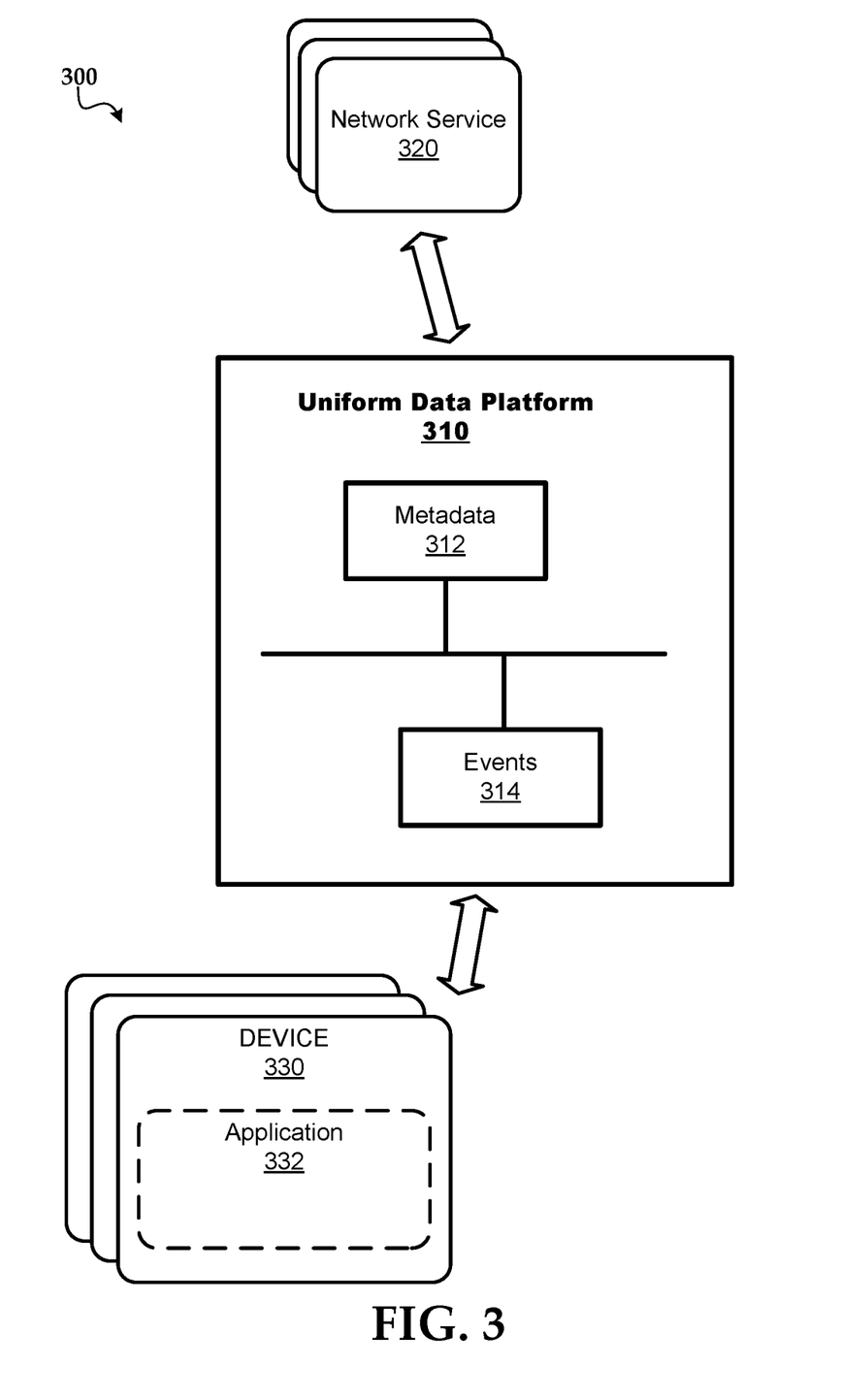
FIG. 3 shows an exemplary system for providing a data model for a uniform data platform, according to one example embodiment.

FIG. 3 illustrates an exemplary system 300 for providing data model for a uniform data platform 310, according to an example embodiment of the disclosure. In one example embodiment, system 300 can include at least one device 330 configured to execute at least one of a plurality of applications 332, each application having an application data structure. A uniform data platform 310 can be executed on one or more servers. The uniform data platform 310 can include a data model which is uniform across the plurality of application data structures. The data model can include metadata 312 corresponding to at least one object indicated in the data model, and events 314 corresponding to a trigger condition associated with at least one metadata entry. The values of the metadata 312 and events 314 can be associated with a user profile. The uniform data platform 310 can be configured to receive application data from the at least one device 330 and store the application data within the data model. The system 300 can also include a plurality of remote networked services 320 configured to access the application data from the uniform data platform 310 using the data model.

In various embodiments, the metadata 312 may include: a list of all activities that a user can do in an application, an activity name, a description of the activity, a state of the activity (whether available, started, or completed), whether the activity is required to complete an objective or campaign, a completion reward for the activity, an intro or outro cutscene, an in-game location, one or more conditions that must be met before the activity becomes available, and a parent activity that contains the activity as a sub-activity. Metadata 312 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 312. In addition, the metadata 312 may indicate whether or not a particular activity, entity (such as a character, item, ability, etc.), setting, outcome, action, effect, location, or attribute should be marked as hidden.

Events 314 may be fired in response to several various trigger conditions. For example, such trigger conditions may include: an activity that was previously unavailable becomes available, a user starts an activity, a user ends an activity, an opening or ending cutscene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 314 may include further information regarding a state of the application when the events 314 were triggered, for example a timestamp, a difficulty setting and character statistics at the time a user starts or ends an activity, success or failure of an activity, or a score or duration of time associated with a completed activity.

Figure 4:
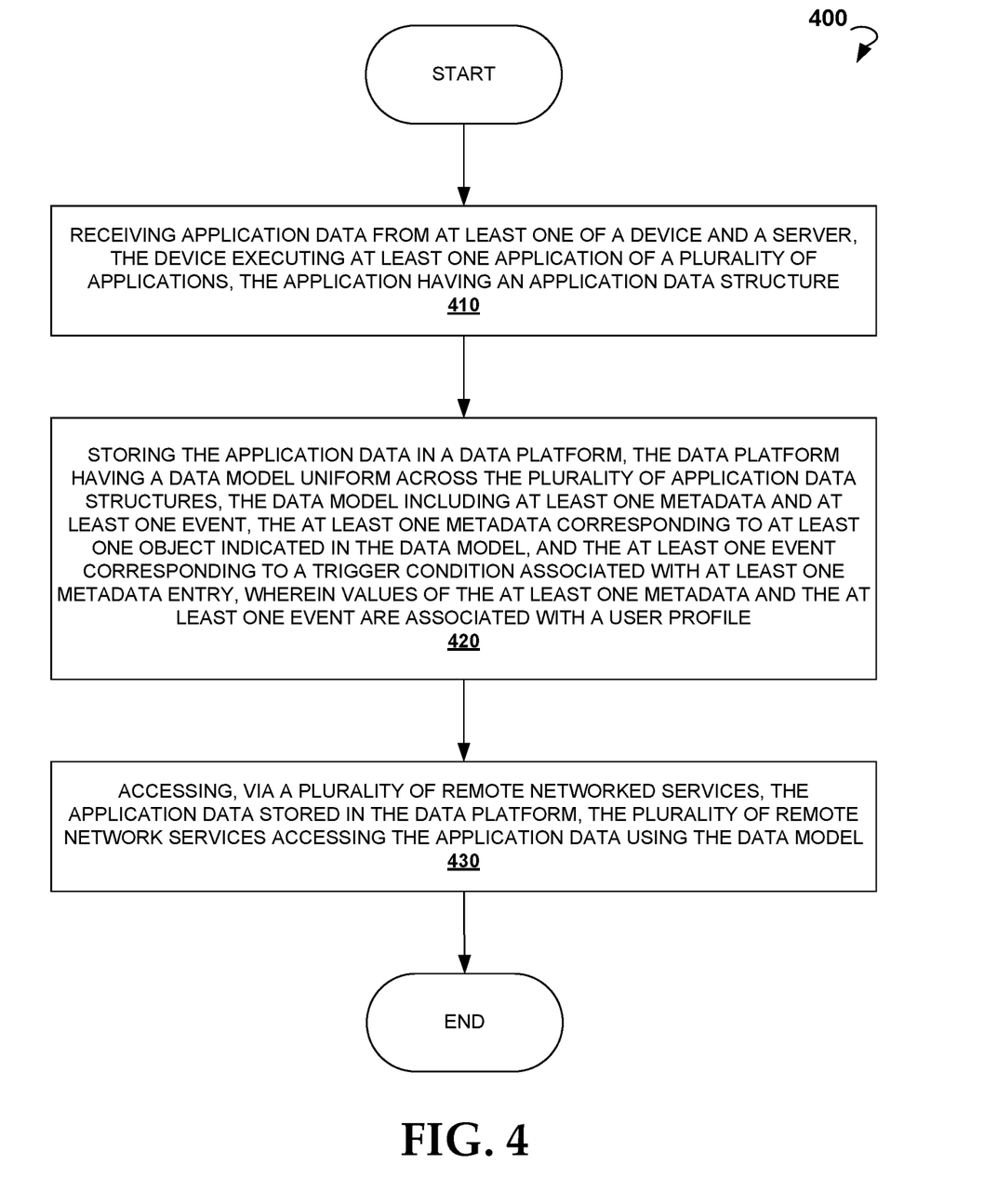
FIG. 4 illustrates a flow diagram of a method for providing a data model for a uniform data platform, according to one example embodiment.

FIG. 4 is a process flow diagram showing a method 400 for providing data model for a uniform data platform. Method 400 can be performed by processing logic that includes hardware (e.g., decision-making logic, dedicated logic, programmable logic, application-specific integrated circuit), software (such as software run on a general-purpose computer system or a dedicated machine), or a combination of both. In example embodiments, the processing logic refers to one or more elements of the system architecture 100 and 200 of FIGS. 1 and 2. Operations of method 400 recited below can be implemented in an order different than the order described and shown in the figure. Moreover, method 400 may have additional operations not shown herein, but which can be evident from the disclosure to those skilled in the art. Method 400 may also have fewer operations than shown in FIG. 4 and described below.

As shown in FIG. 4, a method for providing a data model for a uniform data platform can commence in operation 410 with receiving application data from at least one of a device and a server. The device can execute at least a portion of at least one application of a plurality of applications, the at least one application having an application data structure. In operation 420, method 400 can proceed with storing the application data in a data platform. The data platform can have a data model uniform across the plurality of application data structures. The data model can include at least one metadata and at least one event, the at least one metadata corresponding to at least one object indicated in the data model, and the at least one event corresponding to a trigger condition associated with at least one metadata entry. The values of the at least one metadata and the at least one event can be associated with a user profile. In operation 430, method 400 can proceed with accessing, via a plurality of remote networked services, the application data stored in the data platform. The plurality of remote network services can then access the application data using the data model.

Figure 5:
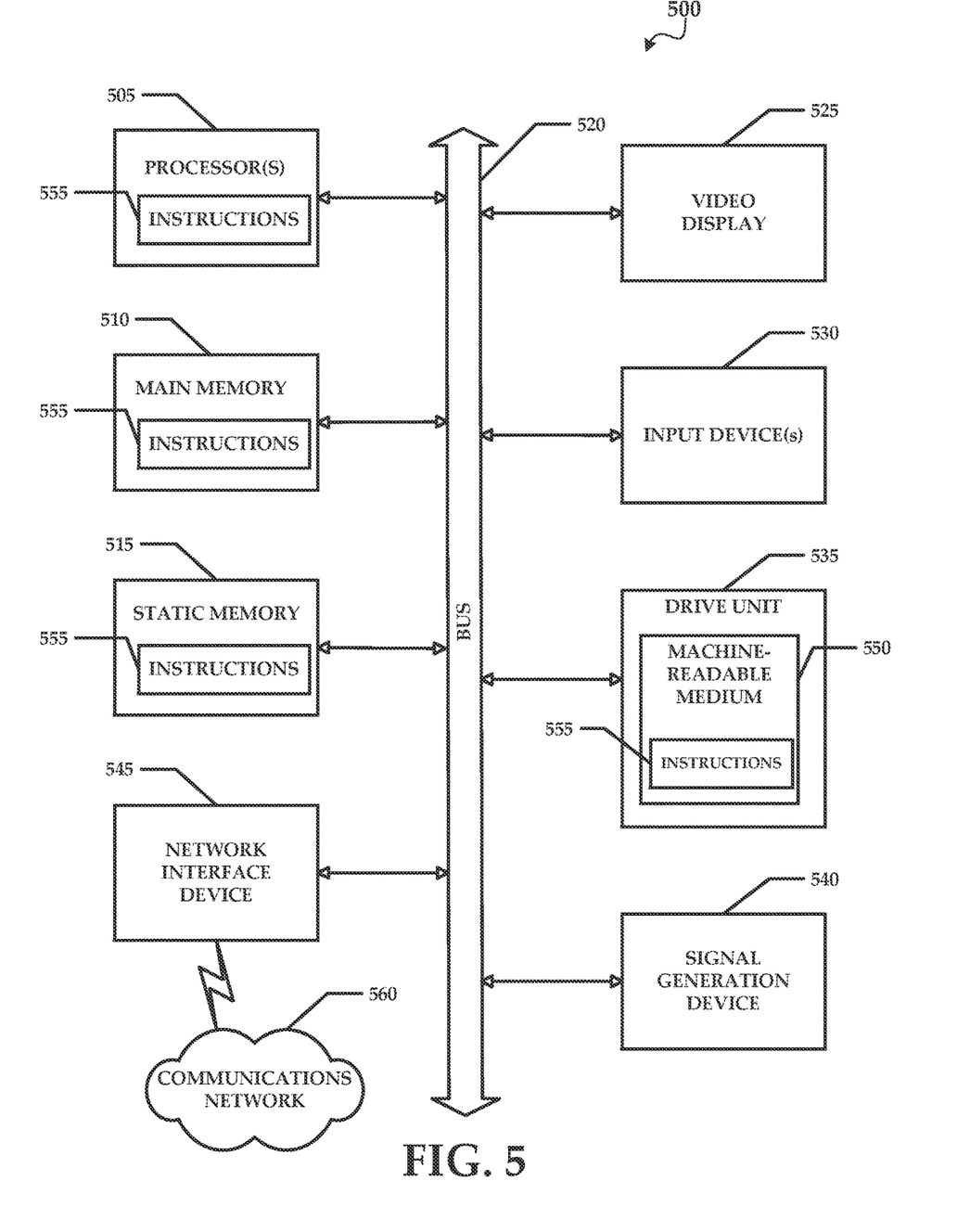
FIG. 5 is a diagrammatic representation of an example machine in the form of a computer system within which a set of instructions for the machine to perform any one or more of the methodologies discussed herein is executed.

FIG. 5 shows a diagrammatic representation of a computing device for a machine in the example electronic form of a computer system 500, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, gaming device, set-top box (STB), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 500 can be an instance of at least a console (see e.g. FIG. 1), game server 130, or UDS server 125, for example.

The example computer system 500 includes a processor or multiple processors 505 (e.g., a central processing unit (CPU), a graphics processing unit (GPU), or both), and a main memory 510 and a static memory 515, which communicate with each other via a bus 520. The computer system 500 can further include a video display unit 525 (e.g., a liquid-crystal display (LCD)). The computer system 500 also includes at least one input device 530, such as an alphanumeric input device (e.g., a keyboard), a cursor control device (e.g., a mouse), a microphone, a digital camera, a video camera, and so forth. The computer system 500 also includes a disk drive unit 535, a signal generation device 540 (e.g., a speaker), and a network interface device 545.

The drive unit 535 (also referred to as the disk drive unit 535) includes a machine-readable medium 550 (also referred to as a computer-readable medium 550), which stores one or more sets of instructions and data structures (e.g., instructions 555) embodying or utilized by any one or more of the methodologies or functions described herein. The instructions 555 can also reside, completely or at least partially, within the main memory 510 and/or within the processor(s) 505 during execution thereof by the computer system 500. The main memory 510 and the processor(s) 505 also constitute machine-readable media.

The instructions 555 can be further transmitted or received over a communications network 560 via the network interface device 545 utilizing any one of a number of well-known transfer protocols (e.g., Hyper Text Transfer Protocol (HTTP), CAN, Serial, and Modbus). The communications network 560 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 560 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for providing a data model for a uniform data platform is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented system for providing a uniform data platform for at least one application of a plurality of applications, the system comprising:
   at least one of an at least one device and an at least one game server configured to execute an at least one application of a plurality of applications, the at least one application having an application data structure;
   a uniform data platform executed on one or more servers, the uniform data platform having a data model being uniform across data structures of the plurality of applications and a plurality of remote networked services, the data model acting as a unifying factor between the plurality of applications and remote networked services, the data model including:
      at least one metadata corresponding to at least one object indicated in the data model; and
      at least one event corresponding to a trigger condition associated with at least one metadata entry, wherein values of the at least one metadata and the at least one event are associated with a user profile, wherein the uniform data platform is configured to receive application data from at least one of the at least one device and the at least one game server and store the application data within the data model; and wherein the data model can assign meaning and contextual information to each portion of application data; and
   the plurality of remote networked services configured to access the application data from the uniform data platform using the data model.

2. The computer-implemented system of claim 1, wherein the at least one object indicated in the data model includes at least one of an activity, an action, an outcome, a location, a character attribute, and a progression.

3. The computer-implemented system of claim 1, wherein the application data is organized according to a logical data structure common to the at least one application of a plurality of applications.

4. The computer-implemented system of claim 3, wherein the at least one application of a plurality of applications is developed to the logical data structure.

5. The computer-implemented system of claim 3, wherein the application data includes game data, the at least one application of a plurality of applications being at least one game of a plurality of games running on at least one user device of a plurality of user devices.

6. The computer-implemented system of claim 5, wherein the logical data structure includes one of the following: a state, location data, character stats, and a choice.

7. The computer-implemented system of claim 6, wherein the state includes at least one of the following: unlockable, unavailable, in progress, and completed, the state being indicative of progression or activity of a player.

8. The computer-implemented system of claim 1, wherein the uniform data platform, the at least one application of a plurality of applications, the one or more servers, and the at least one device are connected via the plurality of the remote networked services.

9. A computer-implemented method for providing a uniform data platform for at least one application of a plurality of applications, the method comprising:
   receiving application data from at least one of an at least one device and an at least one game server, at least one of the at least one device and the at least one game server executing at least a portion of an at least one application of a plurality of applications, the at least one application having an application data structure;
   storing the application data in a data platform, the data platform having a data model uniform across data structures of the plurality of applications and a plurality of remote networked services, the data model acting as a unifying factor between the plurality of applications and remote networked services, the data model including at least one metadata and at least one event, the at least one metadata corresponding to at least one object indicated in the data model, and the at least one event corresponding to a trigger condition associated with at least one metadata entry, wherein values of the at least one metadata and events are associated with a user profile;

assigning, via the data model, contextual information to one or more portions of the application data; and accessing, via the plurality of remote networked services, the application data stored in the data platform, the plurality of remote network services accessing the application data using the data model.

10. The computer-implemented method of claim 9, wherein the at least one object indicated in the data model includes at least one of the following: an activity, an action, an outcome, a location, a character attribute, a progression, a quest, and an enemy.

11. The computer-implemented method of claim 9, wherein the application data is organized according to a logical data structure common to at least one application of a plurality of applications.

12. The computer-implemented method of claim 11, wherein the at least one application of the plurality of applications is developed according to the logical data structure.

13. The computer-implemented method of claim 11, wherein the application data includes game data, the at least one application of a plurality of applications being at least one game of a plurality of games running on at least one user device of a plurality of user devices.

14. The computer-implemented method of claim 13, wherein the logical data structure includes one of the following: a state, location data, character stats, and a choice.

15. The computer-implemented method of claim 14, wherein the state includes at least one of following: unlockable, unavailable, in progress, and completed, the state being indicative of progression or activity of a player.

16. The computer-implemented method of claim 9, wherein the uniform data platform, the at least one application of a plurality of applications, the at least one game server, and the device are connected via the plurality of the remote networked services.

17. A non-transitory computer-readable storage medium having embodied thereon instructions, which when executed by a processor, perform steps of a method, the method comprising:

receiving application data from at least one of an at least one device and an at least one game server, at least one of the at least one device and the at least one game server executing at least a portion of an at least one application of a plurality of applications, the at least one application having an application data structure;

storing the application data in a data platform, the data platform having a data model uniform across data structures of the plurality of applications and a plurality of remote networked services, the data model acting as a unifying factor between the plurality of applications and remote networked services, the data model including at least one metadata and at least one event, the at least one metadata corresponding to at least one object indicated in the data model, and the at least one event corresponding to a trigger condition associated with at least one metadata entry, wherein values of the at least one metadata and the at least one event are associated with a user profile;

assigning, via the data model, contextual information to one or more portions of the application data; and accessing, via the plurality of remote networked services, the application data stored in the data platform, the plurality of remote network services accessing the application data using the data model.

18. The non-transitory computer-readable storage medium of claim 17, wherein the at least one object indicated in the data model includes at least one of the following: an activity, an action, an outcome, a location, a character attribute, a progression, a quest, and an enemy.

19. The non-transitory computer-readable storage medium of claim 17, wherein the application data is organized according to a logical data structure common to the at least one application of a plurality of applications.

\* \* \* \* \*

UNITED STATES PATENT AND TRADEMARK OFFICE
CERTIFICATE OF CORRECTION

| | | |
|---|---|---|
| PATENT NO. | : 11,245,776 B2 | Page 1 of 1 |
| APPLICATION NO. | : 16/653619 | |
| DATED | : February 8, 2022 | |
| INVENTOR(S) | : Adil Sherwani et al. | |

It is certified that error appears in the above-identified patent and that said Letters Patent is hereby corrected as shown below:

On the Title Page

Item (72), Line 5, Inventor Landon Noss's place of residence, listed as "Faguna Niguel, CA" should read "Laguna Niguel, CA".

In the Claims

Column 9, Line 2, the phrase "and events are associated" should read "and the at least one event are associated".

Signed and Sealed this
Twenty-fourth Day of May, 2022

Katherine Kelly Vidal
*Director of the United States Patent and Trademark Office*